United States Patent [19]

Lucero

[11] Patent Number: 5,560,349
[45] Date of Patent: Oct. 1, 1996

[54] AUTOMATIC BROILER APPARATUS

[76] Inventor: James L. Lucero, c/o Ninth & Grand Incorporated, 270 W. Orange Grove Ave., Arcadia, Calif. 91006

[21] Appl. No.: 375,672
[22] Filed: Jan. 20, 1995
[51] Int. Cl.$^6$ ........................................ F24C 3/00
[52] U.S. Cl. ................... 126/41 R; 126/39 BA
[58] Field of Search ............ 126/41 R, 39 BA, 126/21 A

[56] References Cited

U.S. PATENT DOCUMENTS

| 3,693,452 | 9/1972 | McGinley et al. | 99/386 |
| 4,363,957 | 12/1982 | Tachikawa et al. | 219/497 |
| 4,454,501 | 6/1984 | Butts | 126/39 BA X |
| 4,705,018 | 11/1987 | Beach | 126/39 N |
| 4,899,724 | 2/1990 | Kuechler | 126/41 R |
| 5,003,960 | 4/1991 | Hanagan | 126/39 BA |
| 5,099,822 | 3/1992 | Cramer et al. | 126/39 BA |

FOREIGN PATENT DOCUMENTS

| 108530 | 7/1982 | Japan | 126/39 BA |
| 187534 | 11/1982 | Japan | 126/39 BA |

Primary Examiner—Larry Jones
Attorney, Agent, or Firm—Jay H. Maioli

[57] ABSTRACT

An automatically controlled broiler for use in broiling steaks in a restaurant has individual burner units for each grilling position. A memory unit contains a number of different cooking times that are addressed by the cook entering via a keyboard various parameters relating to the broiling operation, such as cooking amount, weight of the steak, and the like. A microcomputer looks-up the cooking time and opens a controllable gas valve for the selected burner unit for the read-out time period, after which the gas at that burner unit is extinguished and an indicator set off to alert the cook. At such time, the cook turns the steak and reactivates the burner unit using the keyboard in case only the first side has been broiled, or the cook takes the steak from the grill in the case that the second side has just been broiled.

10 Claims, 2 Drawing Sheets

| WEIGHT | COOK AMOUNT | VARIABLE | POSITION | SECOND SIDE |
|---|---|---|---|---|
| 10oz | RARE | BONE-IN | ONE | ☒ |
| 12oz | MED RARE | XTRA THK | TWO | ☒ |
| 16oz | MEDIUM | XTRA THIN | THREE | ☒ |
| 24oz | MED.WELL | FLANK STEAK | FOUR | ☒ |
| 32oz | WELL DONE | | FIVE | ☒ |
| | | | SIX | ☒ |

AUTOMATIC BROILER APPARATUS

BACKGROUND OF THE INVENTION

1. Field of the Invention

This invention relates generally to an apparatus for use in the cooking of meat using a broiler and, more particularly, to an apparatus for automatically controlling the cooking time so as to reduce the dependency on the personal supervision of the cook for the desired degree of cooking of the meat.

2. Description of the Related Art

Broiling as a way of preparing meat has become the standard when cooking certain kinds or cuts of meat, such as steak. In commercial restaurants, a broiler man or cook is in charge of a relatively large grill with a natural gas burner unit arranged beneath the grill. Typically, some sort of angled steel serving as a radiant is arranged over the burner to protect it from dripping fat or the like. The broiler man then places the meat on the grill and stands there and watches it as it cooks. The cook then is in charge of turning the meat and ultimately removing it when the desired degree of cooking has been achieved. Therefore, the degree of cooking is at the discretion of the cook.

It has been observed that when a person is in charge of a relatively large grill bearing a large number of steaks, all of which are being cooked to any one of several different selected degrees of cooking from rare to well-done, that frequently the broiler man is not able to properly administer to all of the steaks on the grill. This results in both wasted steak when they are served incorrectly cooked, as well as dissatisfied customers.

Although ovens and other cooking apparatus are known in which temperature probes are inserted into the meat being roasted or cooked, the broiler environment is so hostile as not to permit the use of temperature probes when trying to control the degree of cooking of steaks.

OBJECTS AND SUMMARY OF THE INVENTION

Accordingly, it is an object of the present invention to provide an automatic broiler apparatus that can overcome the above-noted defects inherent in the prior art.

Another object of this invention is to provide an automatic broiler having a number of individual gas burner units in which, after the various parameters of the steak have been entered by the cook, the individual burner unit is automatically turned off after a calculated cooking time, thereby relieving the cook of the obligation to administer to each steak at all times.

A further object of this invention is to provide a computer-controlled broiler system, whereby a cook enters the various parameters of the steak by means of a keyboard and then the gas burner unit is operated at a high level and cooking proceeds for a period of time as determined by the computer before the flame is substantially lowered or extinguished.

In accordance with an aspect of the present invention, a computerized broiler control system is provided in which the memory of the computer contains various cooking times that are then addressed by data input from a keyboard, so that the computer can control the time that each individual burner unit is supplied with gas. Thus, the cooking times for various locations on the broiler grill are automatically controlled by the cook or broiler man entering descriptive information concerning each individual piece of meat being cooked. This information then is used to look-up the cooking time in the memory of the computer, which then ultimately controls the time during which the particular burner in question is provided with gas for cooking.

The above and other objects, features, and advantages of the present invention will become apparent from the following detailed description of illustrative embodiments thereof to be read in conjunction with the accompanying drawings.

BRIEF DISCLOSURE OF THE DRAWINGS

DETAILED DESCRIPTION OF PREFERRED EMBODIMENTS

Figure 1:
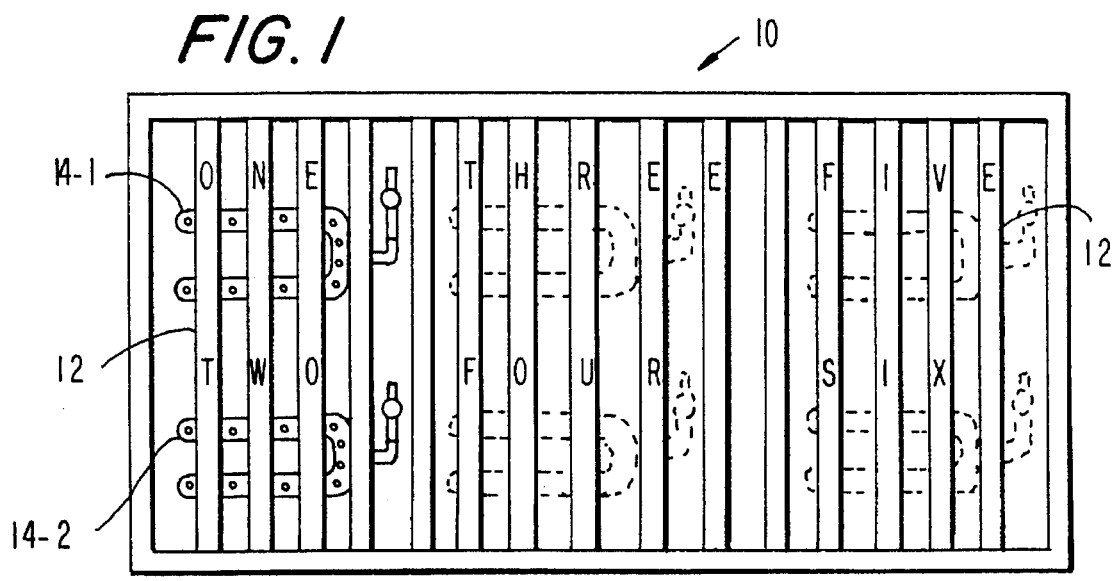
FIG. 1 is a plan view of a broiler showing the arrangement of gas burner units beneath the grill.

In FIG. 1, a plan view of a broiler grill 10 according to an embodiment of the present invention is shown in which the overall size is not seen to be important, that is, the grill can be rectangular, square or the like and can be as large as required. What is important, however, is that the grill 10 has a number of grill bars shown typically at 12 and that the grill bars have printed thereon letters spelling out specific grilling positions on the overall surface of the grill 10. In the example shown in FIG. 1, there are six separate grilling positions defined by the words "one" through "six." Of course, numerals could alternatively be provided and the extent of each grilling position could be shown by a matte finish or the like on the grill bars 12. At each grilling position a separate, individually controlled, gas burner unit, shown typically at 14-1, 14-2, is provided. As will be described hereinbelow, each of these gas burner units is separately controlled based on data input by the cook. Although in the plan view of FIG. 1, the burner units are shown being directly beneath the grill bars 12, in fact, there may be a so-called radiant arranged between the grill bars 12 and the burner units 14-1, 14-2 in order to protect the individual burner unit yet still provide the proper source of heat for cooking. Only two individual, controlled, gas burner units 14-1, 14-2 are shown in FIG. 1, but it will be understood that there is a separate gas burner unit 14-1, 14-2 . . . 14-n for each individual grilling position, and that the number of grilling positions is limited only by the size of the establishment.

Figure 2:
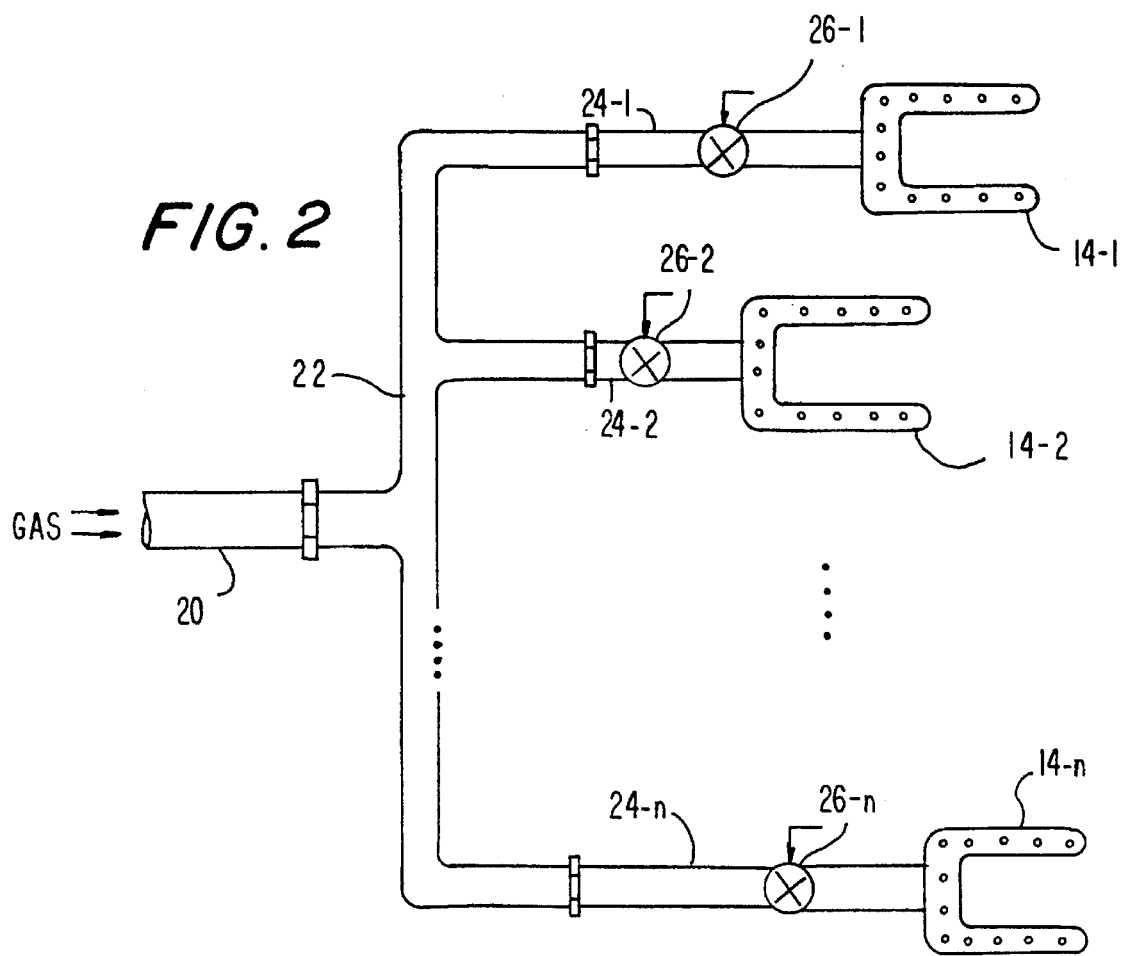
FIG. 2 is a schematic view of a number of individually controlled gas burner units connected to a gas manifold.

As noted above, each of the burner units 14-1, 14-2 . . . 14-n is individually connected to the source of cooking gas, which is typically natural gas. As shown in FIG. 2 the natural gas inlet pipe 20 is connected to a manifold 22 that provides an individual gas supply line 24-1, 24-2 . . . 24-n line connected respectively to each of the burner units 14-1, 14-2 . . . 14-n. An electrically controllable gas shut-off valve 26-1, 26-2 . . . 26-n is located in each of the respective individual gas lines 24-1, 24-2 . . . 24-n and, as will be explained below, the activation of each gas valve 26-1, 26-2 . . . 26-n is automatically and independently controlled based upon information entered by the user of the system.

Figures 3, 4:
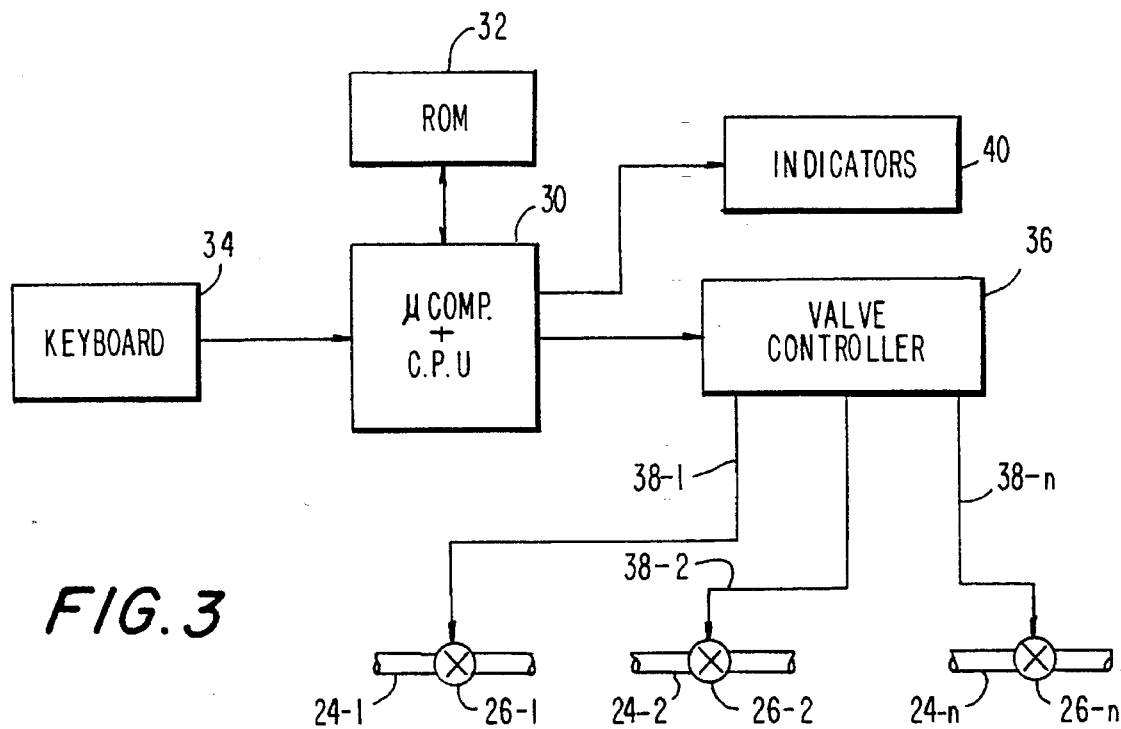
FIG. 3 is a schematic in block diagram form of an automatic broiler control system according to an embodiment of the present invention.
FIG. 4 is a pictorial representation of the keyboard used in the system shown in FIG. 3.

FIG. 3 shows the control system for controlling operation of the gas flow valves 26-1, 26-2 . . . 26-n in the individual gas burner system of FIG. 1. A microcomputer 30 is provided that includes the standard microprocessor or microcomputer elements such as input/output ports, central processing unit, random access memory, and read only memory, and the like. In that regard, the read only memory is separately shown at 32 because its contents, which are initially placed therein, are important to the operation of the present invention. For example, the read only memory 32 contains various cooking times that can be looked up or addressed, based upon inputs fed by the operator through a keyboard 34. For example, if the cook uses keyboard 34 and enters the known weight of the steak and the degree of cooking desired by the patron, such as medium, and then wishes to perform the cooking operation at cooking location number two, for example, this information is entered and the read only memory 32 determines the length of time that the burner 14-2 is to be supplied with gas. The burner being, of course, the burner unit 14-2 corresponding to grilling position number two. Then, this time information is read out of the read only memory 32 and fed to a valve controller 36 that simply translates the digital information into a voltage signal suitable for operating the electrically operated gas valve 26-2 at grilling position number two. Once the read-out cooking time has expired as determined by the microcomputer 34, the signal on line 38-2 fed to valve 26-2 is set to a zero voltage and a gas supply to the burner unit 14-2 is shut-off. In some instances, it may be desirable to have a pilot light to the burner unit so that the burner unit is not completely extinguished or, on the other hand, it may be desirable to provide a piezo-electric igniter that can also be controlled by the valve controller 36 when it is determined to energize or open one of the controllable gas valves 26-1, 26-2 . . . 26-n.

At the conclusion of the cooking time, the cook is then alerted by means of an either audible indicator, a visual indicator, or both, and such indicators 40 can either be located in a display above the broiler unit 20, with the appropriate positions being identified or individual indicators can be placed right on the broiler 10, by means of light emitting diodes or the like. In any event, once the cooking time has elapsed, the cook is alerted to turn the steak and proceed with cooking the second side.

In that regard, FIG. 4 shows a representation of the keyboard 34 as it might be presented to the cook, so that he can enter all of the appropriate data concerning the steak to be cooked. The keyboard 34 can be of the pressure sensitive kind with a transparent overlay defining the key locations and functions. This kind of keyboard is found in most fastfood restaurants in association with the cash register. The keyboard 34 is provided with a number of different parameters arranged in columns. For example, set forth in column 50 are various weights of steak that might be cooked on the grill 10. Column 52 shows the cooking amount, that is, the extent to which the steak is to be done, and column 54 sets forth some variables that may be present in some instances, such as if there is a bone in a cut of meat, or if it is extra thin or extra thick, or the like. Column 56, sets forth the various grilling positions on the grill unit 10 that are available for use, and column 58 is for use when the second side of the steak is being cooked.

In the operation of the present invention, the cook determines the weight of the steak, and it should be pointed out that in all restaurants the exact weight of each steak is known beforehand to the fraction of an ounce, because that is the way the steaks are purchased from the supplier. Then, the cooking amount is set as requested by the customer and any variables that may be present are also entered. Finally, the cook determines at what grilling position the steak is to be cooked. Assuming it is position number two, the cook presses the appropriate button in column 56 and the information is passed by the microcomputer 30 to the read only memory 32 where the appropriate time is looked up and then the valve controller 36 controls valve 24-2 to be open, so that the burner 14-2 is fed or supplied with the gas for the appropriate period of time. Once the time is elapsed, the flame is substantially extinguished or set to such a low setting that no further cooking takes place and then the indicators 40 are sounded and/or illuminated, so that the cook is made aware of the situation and, at that time, the cook may turn the steak over and cook the second side by depressing the appropriate switch in column 58 corresponding to that position and then the cooking recommences by opening gas valve 26-2 again and energizing the burner unit 14-2. The second side, of course, takes a shorter period of time to cook than did the first side and this is taken into account in the data stored in the read only memory 32. At the conclusion of the cooking of the second side, the gas valve is closed, the indicator is again actuated, and the cooking stops. Moreover, at the conclusion of the cooking of the second side, all of the information for that position is cancelled or deleted so that the cook can once again enter new information corresponding to that grilling position.

Although the system described above is a broiler unit in which the heating units are beneath the grill, the heating units could be above the grill just as easily. Similarly, there could be two heating units one above and one below, in which case the second side operation is not necessary.

Similarly, although the positions have been marked using words indicating the cooking position any suitable indicating system is possible such as colors, textures, symbols, or the like.

Although the present invention has been described hereinabove with reference to the preferred embodiment, it is to be understood that the invention is not limited to such illustrative embodiments alone, and various modifications may be contrived without departing from the spirit or essential characteristics thereof, which are to be determined solely from the appended claims.

What is claimed is:

1. An automatic gas broiler for cooking a plurality of individual food items arranged on a cooking grill, comprising:

a plurality of gas burner units located on a side of the cooking grill opposite a side on which the individual food items are arranged, each of said plurality of gas burners being connected to a supply of cooking gas by a respective plurality of gas supply lines;

a plurality of indicia formed on a food side of the cooking grill, each indicia proximate a respective one of said plurality of gas burner units for individually identifying said burner units;

a plurality of electrically controllable gas shut-off valves respectively located in said plurality of gas supply lines for controlling the supply of cooking gas to said plurality of gas burner units;

controller means for controlling operation of said plurality of gas shut-off valves, whereby each valve is independently controlled, and including a memory containing data corresponding to a plurality of predetermined cooking times; and a keyboard for operation by a user of the broiler and having keys corresponding to known parameters relating to the individual food items, said keyboard being connected to said controller means, whereby upon the user entering parameter information on said keyboard, including an identity of a selected one of said plurality of burner units corresponding to a respetive one of said indicia, said information is used to read-out one of said plurality of predetermined cooking times, whereby the selected one of said burner units is supplied with cooking gas for said one of said plurality of cooking times and then said cooking gas supply is shut-off at the conclusion of the cooking time.

2. An automatic gas broiler according to claim 1, further comprising indicator means connected to said controller means for providing to the user of the broiler an indication at the conclusion of the cooking time.

3. An automatic gas broiler according to claim 2, wherein said indicator means provides a visual and an audible alarm at the conclusion of the cooking times.

4. An automatic gas broiler according to claim 1, wherein said keyboard includes a plurality of columns of keys corresponding to said known parameters, including different weights of the food items, different degrees of cooking of the food items, and identifying data corresponding to said plurality of indicia.

5. An automatic gas broiler according to claim 1, further comprising a manifold having an inlet connected to a cooking gas supply line and having a plurality of outputs each in fluid communication with said inlet and connected respectively to said gas supply line connected to each of said plurality of burner units.

6. An automatic gas broiler for cooking a plurality of steaks arranged on a grill formed of a number of bars supporting the steaks, comprising a plurality of gas burner units arranged in an array relative to said grill and each defining a respective grilling position thereon;

a plurality of indicia formed on said grill for visually identifying each said respective grilling position;

a gas manifold having an inlet connected to a supply of cooking gas and a plurality of supply tubes connected respectively to said plurality of gas burner units;

a plurality of electrically controllable gas flow valves connected respectively in said plurality of supply tubes for controlling a flow of cooking gas to said plurality of gas burner units;

controller means for controlling operation of said plurality of electrically controllable gas flow valves, and including an addressable memory for storing a plurality of different cooking times for said steaks, a central processing unit for addressing said memory in response to parameter data input thereto, and a data input device for actuation by a user of the broiler for inputting parameters corresponding to a cooking operation for each of the plurality of steaks, whereby a cooking time is read out from said memory and at least one of said plurality of burner units is supplied with gas for a selected cooking time and at the end of the cooking time the flow of gas is interrupted by operation of one of said flow valves.

7. An automatic gas broiler according to claim 6, wherein said data input device comprises a keyboard having a plurality of keys for actuation by the user.

8. An automatic gas broiler according to claim 7, wherein said plurality of keys on said keyboard are arranged in columns each corresponding to a different parameter relating to the cooking of the steaks.

9. An automatic gas broiler according to claim 8, wherein said keyboard includes a column of keys corresponding to different cooking amounts, a column of keys corresponding to different weights of steaks, and a column of keys corresponding to different grilling positions on said grill as defined by said plurality of burner units.

10. An automatic gas broiler according to claim 9, further comprising indicator means connected to said controller means for producing a perceptible indication to the user of the broiler each time the flow of gas is interrupted by one of sid flow valves, said indication including the identity of a respective grilling position.

* * * * *